United States Patent
Lehman et al.

(10) Patent No.: US 10,743,711 B2
(45) Date of Patent: Aug. 18, 2020

(54) COOKING SLEEVE FOR VERTICAL GRILL

(71) Applicant: Manitowoc FSG Operations,LLC, New Port Richey, FL (US)

(72) Inventors: Lon Lehman, Ft. Wayne, IN (US); Eugene Tippmann, Jr., Ft. Wayne, IN (US)

(73) Assignee: MANITOWOC FSG OPERATIONS LLC, New Port Richey, FL (US)

( * ) Notice: Subject to any disclaimer, the term of this patent is extended or adjusted under 35 U.S.C. 154(b) by 335 days.

(21) Appl. No.: 15/851,338

(22) Filed: Dec. 21, 2017

(65) Prior Publication Data

US 2018/0177333 A1 Jun. 28, 2018

Related U.S. Application Data

(60) Provisional application No. 62/437,296, filed on Dec. 21, 2016.

(51) Int. Cl.
*A47J 37/06* (2006.01)

(52) U.S. Cl.
CPC ....... *A47J 37/0694* (2013.01); *A47J 37/0611* (2013.01)

(58) Field of Classification Search
CPC .......................... A47J 37/0694; A47J 37/0611
See application file for complete search history.

(56) References Cited

U.S. PATENT DOCUMENTS 8,367,977 B2 * 2/2013 Lehman .................. A47J 27/04
219/386

* cited by examiner

*Primary Examiner* — John C Hong
(74) *Attorney, Agent, or Firm* — Ohlandt, Greeley, Ruggiero and Perle, LLP

(57) ABSTRACT

A cooking sleeve, which may also be described as a cooking pouch, which is removably secured to a vertical grill. The cooking sleeve is compressible, but restores to an original shape when compression is released. Food is inserted into the sleeve at a first end and exits the sleeve at a second, opposite end. The cooking sleeve is non-stick and formed of a food grade material.

11 Claims, 7 Drawing Sheets

“COOKING SLEEVE FOR VERTICAL GRILL

CROSS-REFERENCE TO RELATED APPLICATIONS

This application claims the benefit of priority to U.S. Provisional Patent Application No. 62/437,296, filed on Dec. 21, 2016, which is hereby incorporated by reference in its entirety.

TECHNICAL FIELD

This disclosure relates to cooking sleeves for vertical cooking grills.

BACKGROUND

Vertical cooking grills provide a compact arrangement for efficient, high-volume cooking of food. During the cooking process, food is loaded from the top of the vertical grill. The food is retained in a cooking position until heated to a desired temperature. The food is then released from a cooking position to drop onto a food receiving location for removal from the vertical cooking grill.

SUMMARY

This disclosure provides a cooking unit including at least one cooking slot and a sleeve. The at least one cooking slot is oriented in a vertical direction. The sleeve includes a sleeve body. The sleeve body includes an upper opening and a lower opening, and the sleeve body positioned within the at least one cooking slot such that the upper opening is positioned near a top of the at least one cooking slot and the lower opening is positioned near a bottom of the at least one cooking slot.

Advantages and features of the embodiments of this disclosure will become more apparent from the following detailed description of exemplary embodiments when viewed in conjunction with the accompanying drawings.

DETAILED DESCRIPTION

Figure 1:
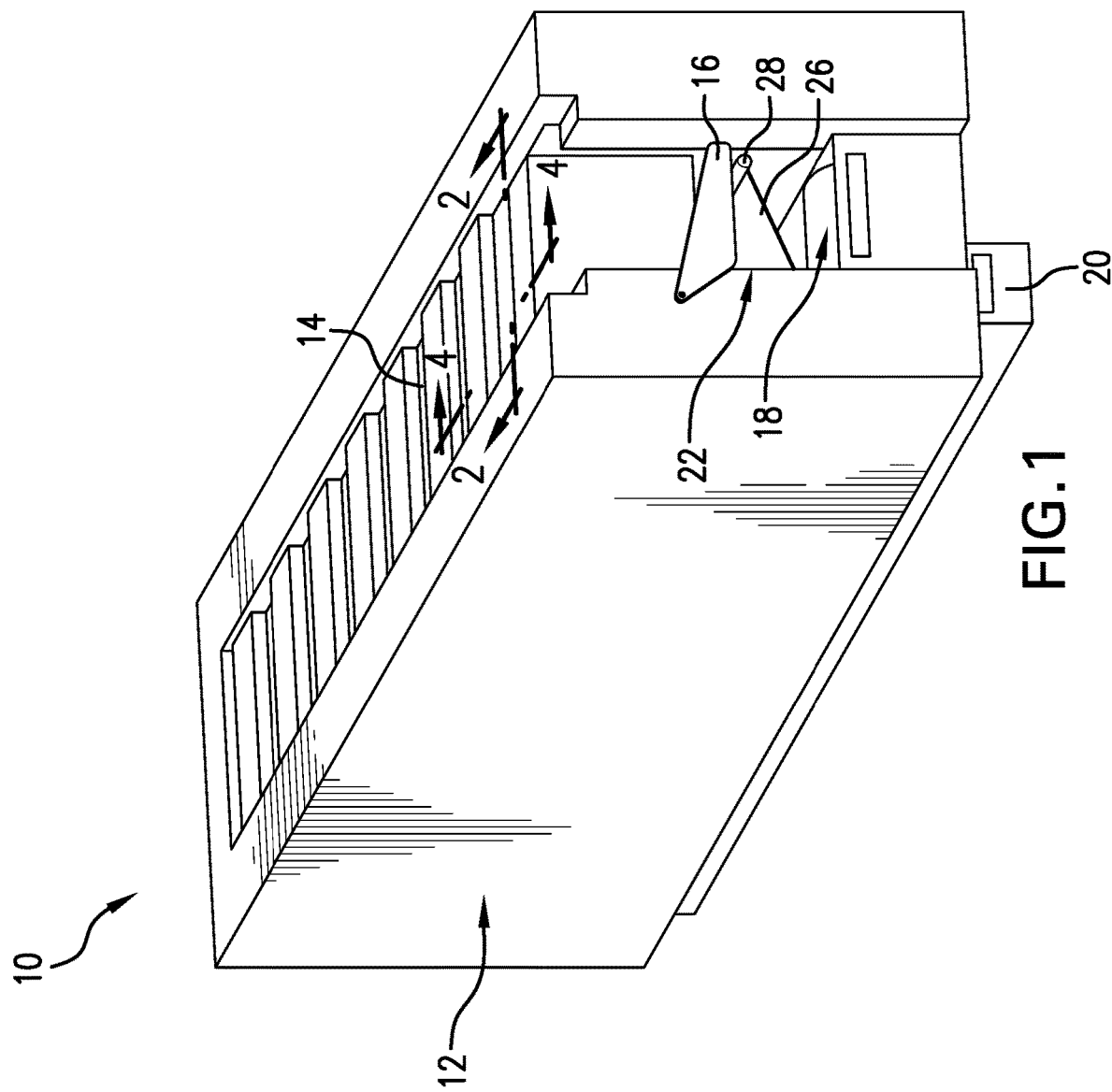
FIG. 1 shows a perspective view of a vertical grill incorporating a cooking sleeve in accordance with an exemplary embodiment of the present disclosure.

Referring to FIG. 1 a vertical cooking grill is shown and generally indicated at 10. Vertical cooking grill 10 is typically used in environments requiring high volumes of cooked food or food product, such as in cafeterias, fast food restaurants, and the like. While vertical cooking grills provide many advantages in fast, efficient cooking of food product, one challenge with vertical grills is that food can stick to the cooking surfaces with repeated use of the grill. Such sticking can be alleviated with the use of non-stick surface formed on the cooking surfaces. However, cleaning such surfaces can be difficult and time consuming, potentially involving the removal of the cooking surfaces. The cooking sleeve or pouch disclosed herein provides non-stick cooking surface interface that is easily removable and replaceable while being cost effective.

Figure 2:
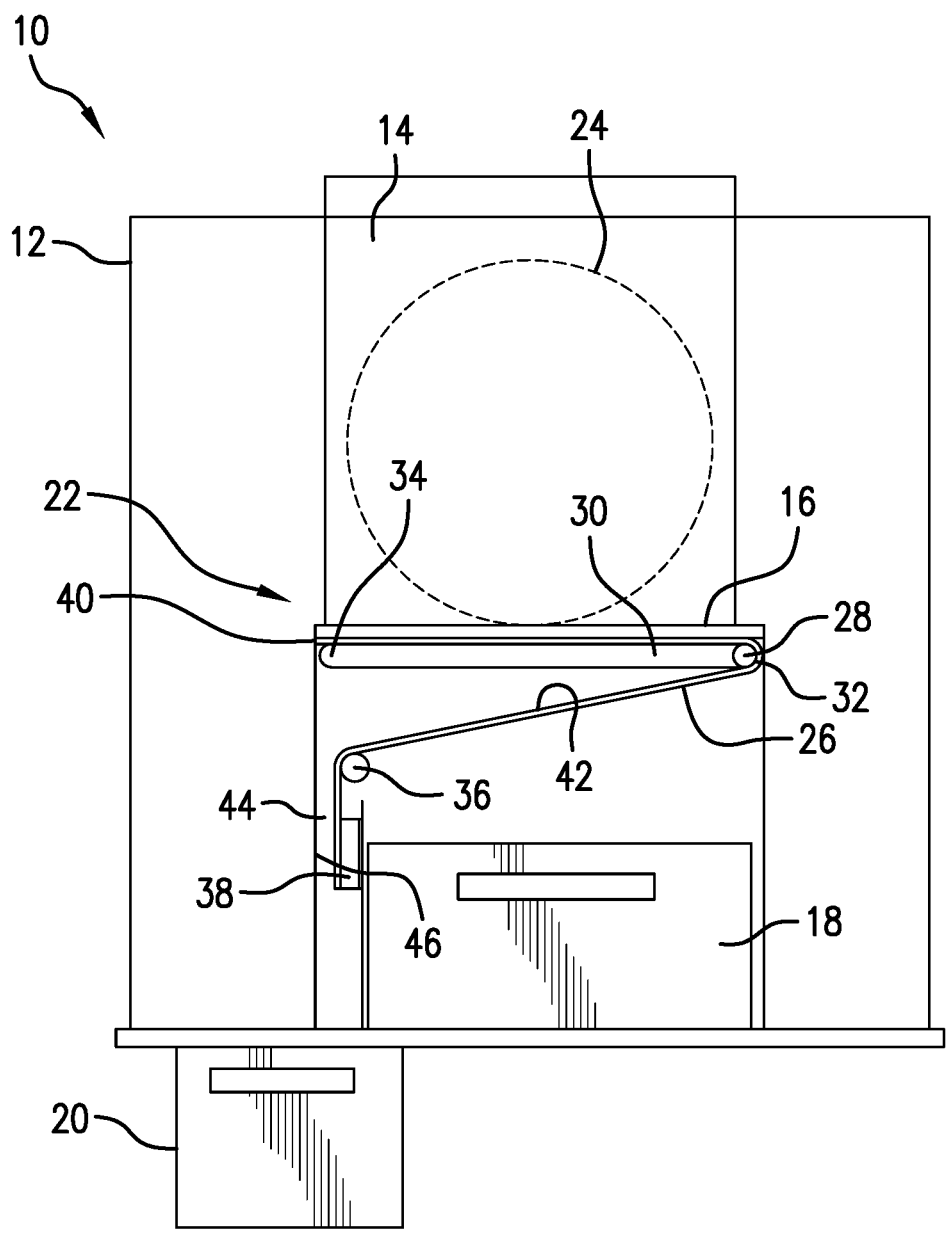
FIG. 2 shows a view of the vertical grill of FIG. 1 along the lines 2-2 with a food patty in a cooking position in accordance with an exemplary embodiment of the present disclosure.
Figure 3:
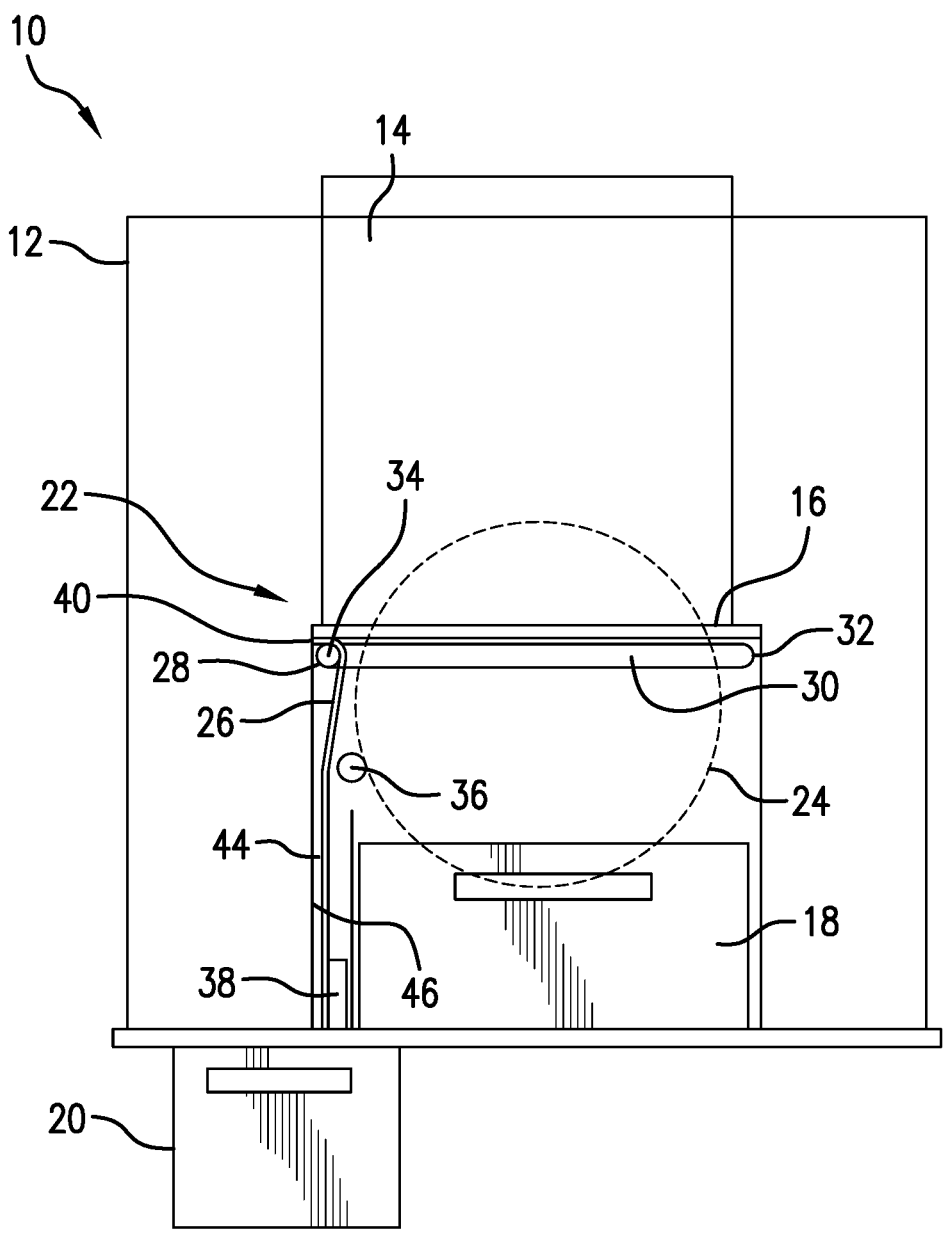
FIG. 3 shows a further view of the vertical grill of FIG. 2 with a grease curtain and movable door positioned to permit the food patty to move from the cooking position to a food receiving location.

Referring to FIGS. 1-3, vertical cooking grill 10 includes a housing 12 in which are positioned a plurality of cooking slots 14, a trap door 16, a food product delivery tray or finished product receiving area 18, a grease pan 20, and a movable door system 22. Vertical cooking grill 10 may be similar to the grill shown in U.S. Pat. No. 8,367,977, the entire content of which is incorporated herein by reference in its entirety. Cooking slots 14 are oriented in a vertical direction and are configured to hold a food product 24. Once food product 24 is cooked, trap door 16, which includes a plurality of openings, is moved from a closed position to an open position where the openings permit cooked food product to fall under the influence of gravity onto food product delivery tray 18.

In the exemplary embodiment, vertical cooking grill 10 includes movable door system 22, which includes a flexible door or movable curtain 26, a top or movable rod 28 over which flexible door 26 extends or is draped, a pair of tracks 30 in which movable rod 28 slides between a first position 32 and a second position 34, a fixed rod 36, and a weight or other tensioner 38. Flexible door 26 is fabricated from a sheet of flexible, food grade material. In an exemplary embodiment, the food grade material is a sheet of Teflon. The sheet of Teflon is fixedly attached to vertical cooking grill at an anchor location 40, and then routed over movable rod 28, and then around fixed rod 36. Tracks 30 are horizontally oriented and are attached to trap door 16 along a first or front side and along a second or back side in a location such that movable rod 28 presses the material of flexible door 26 against an underside of trap door 16 as movable rod 28 traverses from first position 32 to second position 34. The end of flexible door 26 that extends vertically below fixed rod 36 receives weight or other tensioner 38, which keeps flexible door 26 against movable rod 28 as movable rod 28 moves between first position 32 and second position 34 along track 30.

Movable rod 28 moves between first position 32 and second position 34 under the manual action of an operator, or by the power of an actuator (not shown). Movable rod 28 is shown in first position 32 in FIG. 2. As food product 24 cooks, oil, grease, and other debris from the cooking process falls vertically onto trap door 16 and onto flexible door 26 when such debris falls through openings in trap door 16. Liquid debris such as oil and/or grease flow onto flexible door 26. Once the cooking process is complete, an actuator changes the position of movable rod 28 from first position 32 to second position 34. As movable rod 28 traverses the underside of trap door 16, movable rod 28 wipes oil and/or grease from the underside of trap door 16, causing the oil and/or grease and other debris to flow along an upper angled surface 42 of flexible door 26 or through gaps in flexible door 26 adjacent to where flexible door 26 attaches to vertical cooking grill 10. Debris from the cook process flows along a debris channel 44 located between a vertical portion of flexible door 26 that is vertically below fixed rod 36 and an interior or inner wall 46 of housing 12. The debris continues to flow vertically into grease pan 20, which is removed periodically for disposal of the debris and cleaning of grease pan 20.

As movable rod 28 traverses from first position 32 to second position 34, weight or tensioner 38 keeps flexible door 26 under tension, which enables flexible door 26 to maintain contact with movable rod 28 as movable rod 28 traverses from first position 32 to second position 34, which thus moves flexible door 26, which is positioned vertically along a longitudinal line between cooking slots 14 and food product delivery tray 18 while food product 25 is cooking, into a position where flexible door 26 is no longer positioned longitudinally between cooking slots 14 and flexible door 26, as shown in FIG. 3. Once movable rod 28 is in second position 34, trap door 16 is actuated to move slots in trap door 16 such that the slots are aligned with cooking slots 14, which permits cooked food product 24 to fall vertically onto food product delivery tray 18. Once food product has dropped vertically from cooking slots 14 into food product delivery tray 18, trap door 16 is closed, and movable rod 28 is restored to second position 34 from first position 32, and the cooking process is repeated with additional food product 24 delivered to cooking slots 14.

Trap door 16 and movable door system 22 are easily removable from vertical cooking grill 10 to permit cleaning of trap door 16 and the components of movable door system 22.

Figure 6:
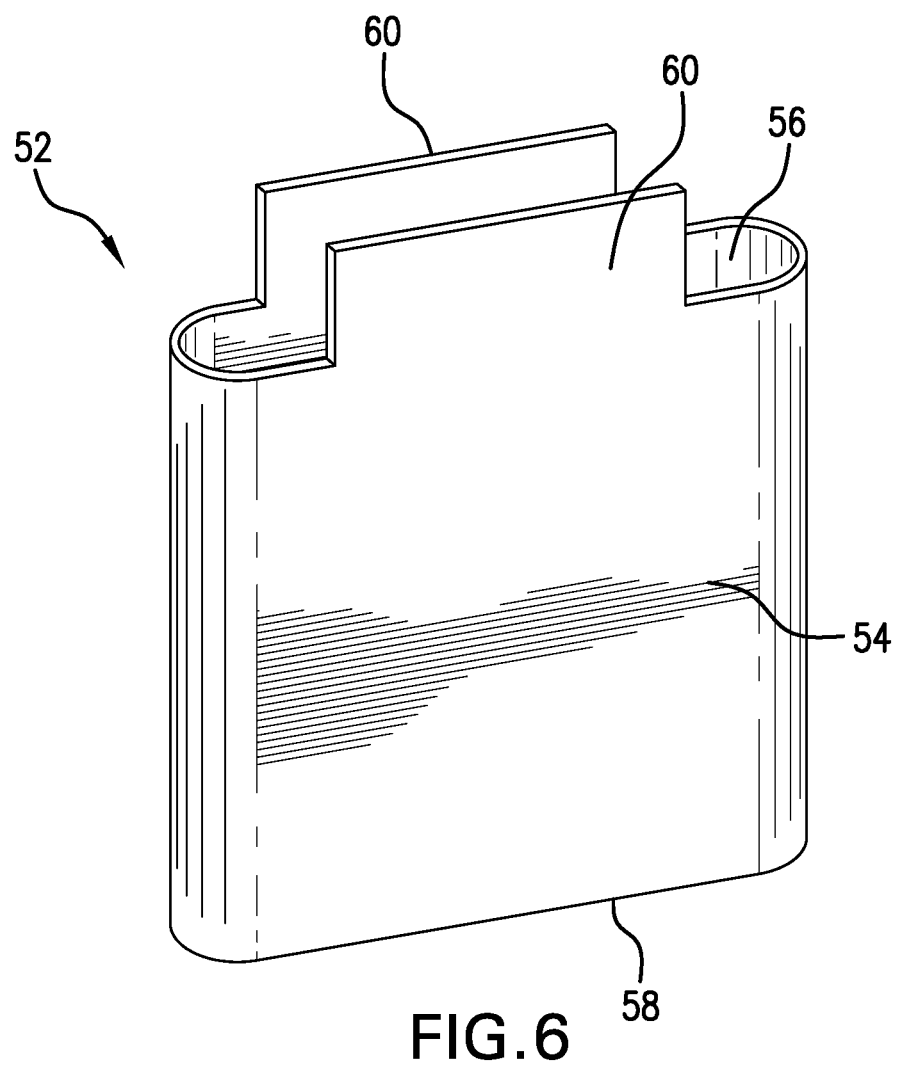
FIG. 6 shows a perspective view of a cooking sleeve in accordance with an exemplary embodiment of the present disclosure.
Figure 7:
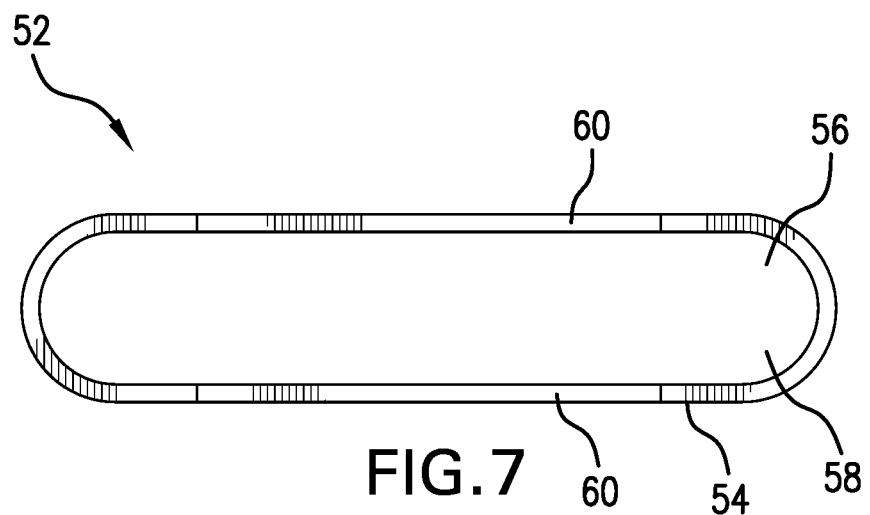
FIG. 7 shows a top view of the cooking sleeve of FIG. 6 with the cooking sleeve in an uncompressed configuration.
Figure 8:
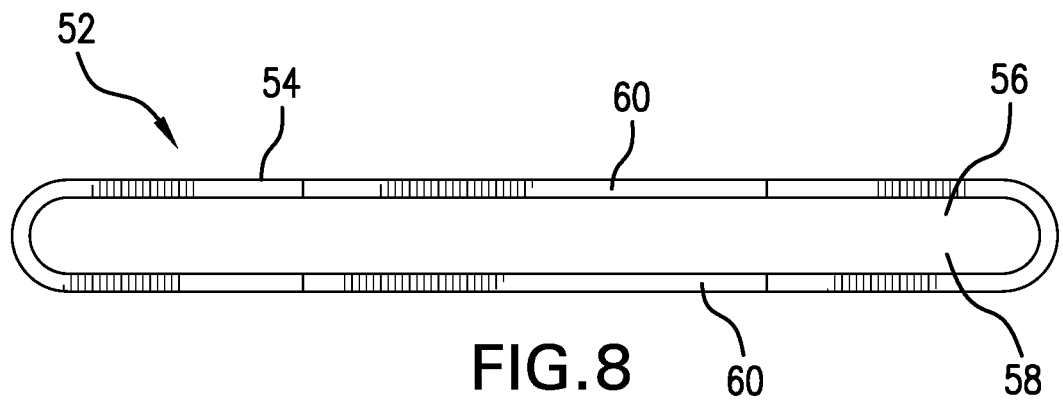
FIG. 8 shows a top view of the cooking sleeve of FIG. 6 with the cooking sleeve in a compressed configuration.
Figure 9:
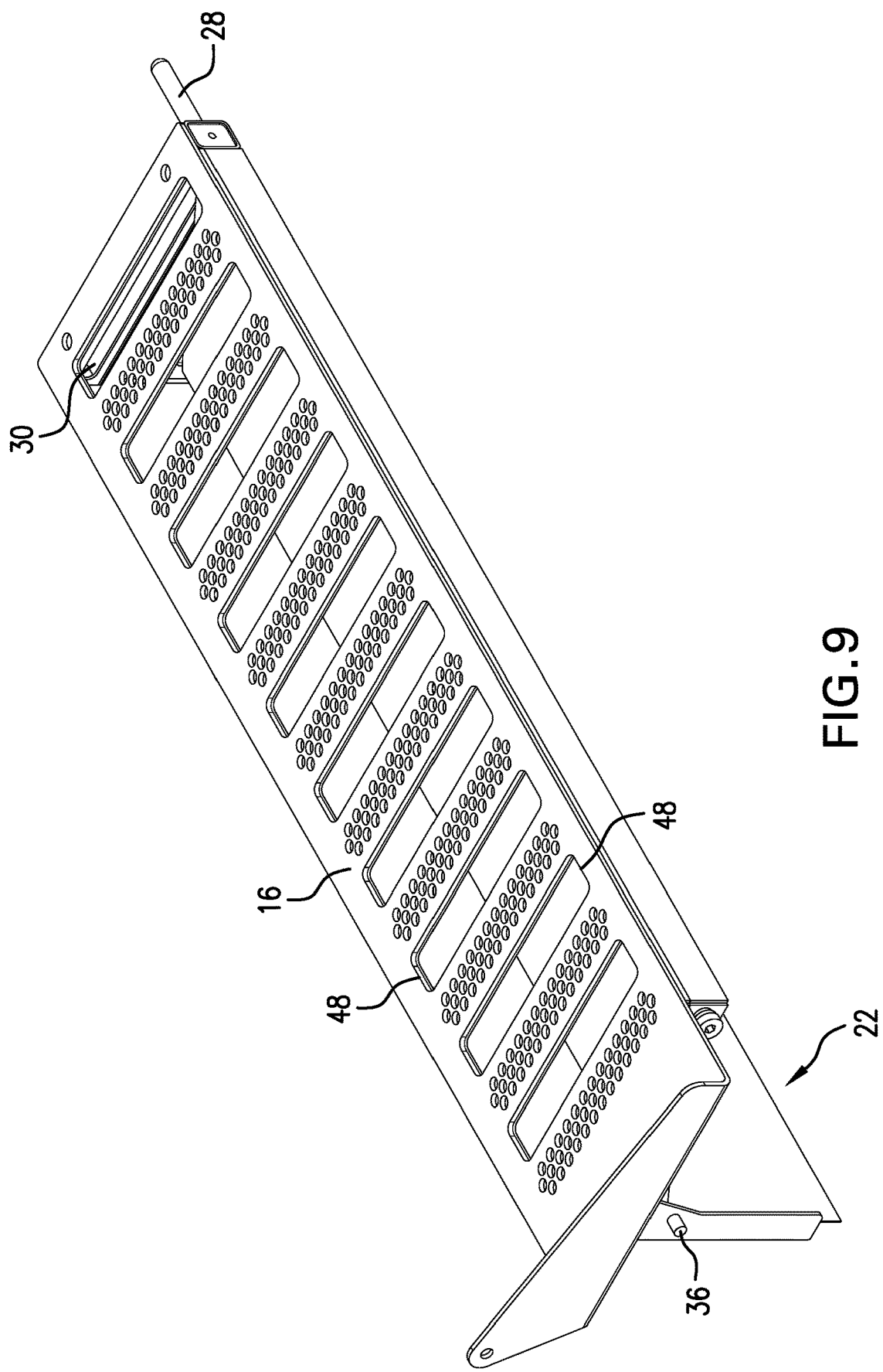
FIG. 9 is a perspective view of a movable door system of the vertical grill of FIG. 1.

Vertical cooking grill 10 further includes a cooking sleeve, cooking pouch, or cooking liner 52. As shown in FIGS. 6-8, sleeve 52 is a flattened cylinder. In other words, a body 54 of cooking liner 52 is shaped as a tube, with a first or upper opening 56 and a second or lower opening 58. Extending from a first or top end of body 54 are two extensions or protrusions 60.

Vertical cooking grill 10 includes an attachment device or mechanism 62. In the exemplary embodiment of FIGS. 4 and 5, attachment device 62 includes a clamp arm 64, a pivot or hinge 66, and a gripping or securing end 68. Pivot or hinge 66 includes a torsional spring (not shown) that causes gripping or securing end 68 to be biased into contact with a portion of housing 12.

Vertical cooking grill 10 further includes a slot, gap, or opening 70 formed into an interior portion of each cooking slot 14. Opening 70 provides access to a chamber 72.

Cooking sleeve 52 is slid into position in a cooking slot 14 from a top or upper end of cooking slot 14. One extension 60 is routed, pushed into, or extended into and through opening 70 into chamber 72. The other, opposite extension 60 is positioned between housing 12 and gripping end 68, which is accomplished by lifting clamp arm 64, positioning extension 60 between housing 12 and gripping end 68, and releasing clamp arm 64. Cooking sleeve 52 is now secured within cooking slot 14 of vertical cooking grill 10.

Figure 4:
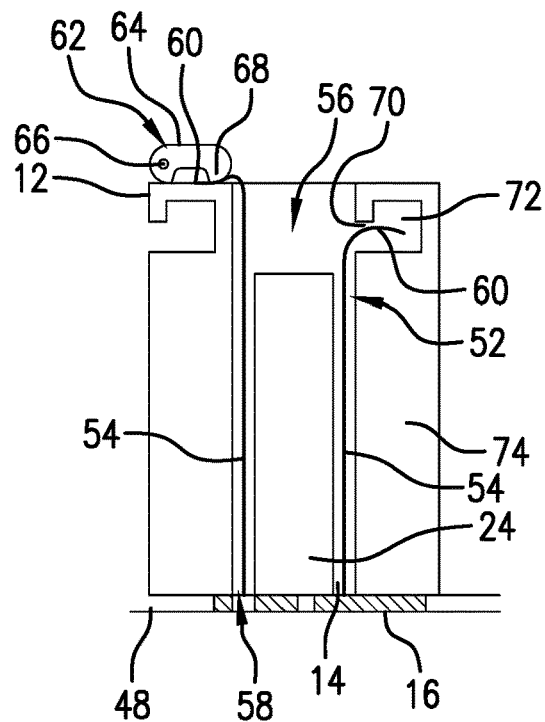
FIG. 4 shows a view of the vertical grill of FIG. 1 along the lines 4-4 with a food patty in a cooking position.

During operation, and as shown in FIG. 4, food product 24 is inserted into first or upper opening 56. The position of extensions 60 are such that food product 24 is guided into body 54 of cooking sleeve 52 without catching on any edges. As described hereinabove, food product 24 is maintained within cooking slot 24 by movable trap door 16.

To cook food product 24, a movable platen 74 is moved toward food product 24. As platen 74 is moved toward food product 24, cooking sleeve 52 is compressed or deformed from the approximate shape shown in FIG. 7 to the approximate shape shown in FIG. 8. As cooking sleeve 52 is compressed, extension 60 that extends through opening 70 extends further through opening 70 into chamber 72, as shown in FIGS. 4 and 5.

Figure 5:
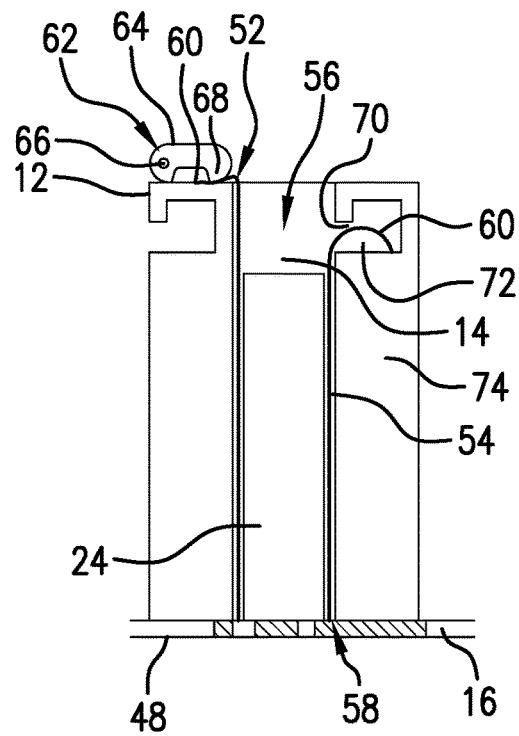
FIG. 5 shows a further view of the vertical grill of FIG. 4 with a platen of the vertical grill closed for cooking of the food patty.

The platen positioned to cook food product 24 is shown in FIG. 5. Steam passages (not shown) formed in housing 12 then cooking food product by transferring heat through cooking sleeve 52 into food product 24. Once cooking is complete, platen 74 is moved away from food product 24, and door 16 is moved laterally or transversely to the direction of cooking slot 14 such that opening 48 in door 16 is aligned with cooking slot 14, and food product 24 drops under the force of gravity through second or lower opening 58 into or onto food product delivery tray 18. As platen 74 moves from the position shown in FIG. 5 to the position shown in FIG. 4, compression of cooking sleeve 52 is released, and the thickness of cooking sleeve 52 provides a restoring or spring force to cooking sleeve 52 that causes cooking sleeve 52 to move from the shape shown in FIG. 8 to the shape shown in FIG. 7. At the same time, extension 60 that extends through opening 70 is retracted through opening 70 away from chamber 72, moving from the position shown in FIG. 5 to the position shown in FIG. 4.

As described hereinabove, cooking sleeve 52 is formed of a food grade material. It should be apparent that the food grade material can have a degree of spring to provide a restoring force to enable cooking sleeve 52 to move from a compressed to an uncompressed configuration. One exemplary material for cooking sleeve 52 can be polytetrafluoroethylene (PTFE), which is known by the trade name Teflon. Another exemplary material is silicone. Other non-stick or low-friction materials can be used.

Approximate exemplary dimensions for cooking sleeve 52 can include a height of 6 inches, extension width of 4 inches, extension height of 1.38 inches, a sleeve circumference in the range 12.25 to 12.37 inches, open dimensions of 5.63 inches by 0.95 inches, and closed or compressed dimensions of 6 inches by 0.2 inches. An exemplary thickness of cooking sleeve 52 is 0.004 inches. However, it should be understood from the present disclosure that the thickness of cooking sleeve 52 can be less or more than 0.004, as long as cooking sleeve 52 is sufficiently durable for a plurality of cooking cycles and as long as cooking sleeve 52 will have sufficient restoring force to return to an uncompressed state when platen 74 is moved away from food product 24.

While cooking sleeve 52 is shown secured to vertical cooking grill 10 by a clamp device or mechanism, it should be understood that other devices or mechanisms can be used to secure cooking sleeve 52 to grill 10. For example, openings formed in extensions 60 can be secured to pins. Such openings can include an interference fit with the mating pins to aid in securing cooking sleeve 52 to grill 10, or a clamp may be positioned to prevent cooking sleeve 52 from sliding off from the pins. Fasteners can also be used to secure sleeve 52 to grill 10, as well as hook and loop fasteners, adhesives, and the like compatible with the food, grease, and temperature environment of vertical cooking grill 10. One feature of such attachment is ease of removal of cooking sleeve 52. The ability to remove cooking sleeve 52 enables ease of cleaning of sleeve 52 and ease of replacement as sleeve 52 wears.

It should be apparent that sleeve 52 can be partially cleaned during use by way of a swab or squeegee sized and dimensioned to fit into cooking slot 14 when cooking slot 14 is open. The squeegee can be inserted several times into each cooking sleeve 52, pushing residue toward second or lower opening 58, decreasing buildup during operation that can lead to an undesirable appearance of food product 24.

While various embodiments of the disclosure have been shown and described, it is understood that these embodiments are not limited thereto. The embodiments may be changed, modified, and further applied by those skilled in the art. Therefore, these embodiments are not limited to the detail shown and described previously, but also include all such changes and modifications.

We claim:

1. A cooking unit, comprising:
    at least one cooking slot oriented in a vertical direction; and
    a sleeve including a sleeve body, the sleeve body including an upper opening and a lower opening, the sleeve body positioned within the at least one cooking slot such that the upper opening is positioned near a top of the at least one cooking slot and the lower opening is positioned near a bottom of the at least one cooking slot.

2. The cooking unit of claim 1, wherein the sleeve is fabricated from a food grade material capable of being compressed and restored to its original shape.

3. The cooking unit of claim 2, wherein the food grade material is selected from the group consisting of nonstick materials, low-friction materials, and a combination thereof.

4. The cooking unit of claim 2, wherein the food grade material is selected from the group consisting of polytetrafluoroethylene, silicon, and a combination thereof.

5. The cooking unit of claim 1, wherein the sleeve comprises at least one extension protruding from an upper end of the sleeve body.

6. The cooking unit of claim 5, wherein the sleeve further comprises a second extension protruding from the opposite side of said upper end of the sleeve body from the at least one extension, wherein said second extension is releasably disposed within an opening in a chamber disposed in a sidewall of said cooking unit adjacent to said cooking slot.

7. The cooking unit of claim 5, wherein the cooking unit further comprises at least one securing mechanism disposed in proximity to the upper opening of the cooking slot positioned adjacent to the at least one cooking slot, said securing mechanism being connected to the cooking unit and capable of securing at least one extension to said securing mechanism.

8. The cooking unit of claim 7, wherein said securing mechanism is selected from the group consisting of: a clamp, pins, fasteners, hook and loop fasteners, adhesives and combinations thereof.

9. The cooking unit of claim 1, wherein said sleeve is removably disposed within said cooking slot.

10. The cooking unit of claim 1, wherein said cooking unit is a vertical cooking grill.

11. The cooking unit of claim 1, further comprising a movable door system and a food product delivery area, wherein said movable door system is disposed between said cooking slot and said food product delivery tray, such that when a food product is disposed within said sleeve for cooking, said movable door system is in the closed position, and
    when said food product has been cooked, said movable door is in the opened position, such that said food product is released from said sleeve and cooking slot via said lower opening of said sleeve into said food product delivery area.

* * * * *